United States Patent [19]

Bridgeford

[11] Patent Number: 4,999,425
[45] Date of Patent: Mar. 12, 1991

[54] CELLULOSE AMINOMETHANATE BY ION-EXCHANGE EXTRACTION

[75] Inventor: Douglas J. Bridgeford, Champaign, Ill.

[73] Assignee: Teepak, Inc., Westchester, Ill.

[21] Appl. No.: 365,275

[22] Filed: Jun. 12, 1989

[51] Int. Cl.$^5$ .......................... C08B 3/00; A22C 13/00
[52] U.S. Cl. ........................................ 536/30; 536/32; 426/105
[58] Field of Search ....................... 536/30, 32; 8/125; 138/118.1; 426/105

[56] References Cited

U.S. PATENT DOCUMENTS

| | | | |
|---|---|---|---|
| 1,771,461 | 7/1930 | Lilienfeld | 536/30 |
| 2,129,708 | 9/1938 | Schreiber | 536/30 |
| 2,134,825 | 11/1938 | Hill et al. | 536/30 |
| 3,291,789 | 12/1966 | Bridgeford | 536/30 |
| 3,557,082 | 1/1971 | Bridgeford | 536/30 |
| 4,404,369 | 9/1983 | Huttunen et al. | 536/30 |
| 4,456,749 | 6/1984 | Mandell et al. | 536/30 |
| 4,486,585 | 12/1984 | Turunen et al. | 536/30 |
| 4,526,620 | 7/1985 | Selin et al. | 106/203 |
| 4,530,999 | 7/1985 | Selin et al. | 536/30 |
| 4,567,255 | 1/1986 | Eklund et al. | 536/30 |
| 4,583,984 | 4/1986 | Turunen et al. | 8/125 |
| 4,639,515 | 1/1987 | Turunen et al. | 536/30 |
| 4,762,564 | 8/1988 | Bridgeford | 106/204 |
| 4,777,249 | 10/1988 | Bridgeford | 536/30 |
| 4,789,006 | 12/1988 | Bridgeford et al. | 130/118.1 |

FOREIGN PATENT DOCUMENTS 85890246 4/1986 European Pat. Off. .

Primary Examiner—Nathan M. Nutter
Attorney, Agent, or Firm—Howard M. Ellis; William J. Crossetta; Michael L. Dunn

[57] ABSTRACT

This invention relates to an improvement to a process for synthesizing cellulose aminomethanate which comprises slurrying cellulose in an aqueous caustic solution, in the presence of urea; steeping the slurried mixture for a time sufficient to permit swelling of the cellulose for uniform distribution of the urea; concentrating the steeped mixture and treating an extraction of the concentrate with an ion-exchanger. When cellulose aminomethanate is manufactured from product prepared in accord with this process, it has a uniform distribution of substituent throughout the cellulose at the molecular level and comprises a suitable product for manufacturing sausage casing.

17 Claims, No Drawings

CELLULOSE AMINOMETHANATE BY ION-EXCHANGE EXTRACTION

BACKGROUND OF THE INVENTION (a) Field of the Invention

This invention relates to a process for synthesizing cellulose aminomethanate which has utility in the manufacture of sausage casing and other cellulose products.

(b) History of the Prior Art

Cellulose xanthate, dissolved as viscose, has been utilized for many years in the manufacture of regenerated cellulose film which has particular utility as sausage casings. With the increase in environmental awareness, concerns have been raised to the environmental management of flammable and toxic reactants and by-products of the viscose manufacturing process. The rapidly escalating cost of by-product management, coupled with the intrinsic costs of additives, which are necessary when utilizing viscose for regenerated cellulose sausage casings, has forced the sausage casing industry to search for viable alternatives to current viscose manufacturing processes.

One alternative, which has more recently been the focus of research for possible replacement of the viscose process in the sausage casing industry is the use of ammonia derivatives, such as urea, reacted with cellulose to form a soluble cellulose derivative. The use of such materials is preferable as byproducts are easily managed and do not appear to represent significant environmental impact. U.S. Pat. Nos. 1,771,461; 2,134,825; and 2,129,708 comprise some of the early work in that technology demonstrating that film products are obtainable that have utility. Though the final products formed showed potential for use as a film, it wasn't until U.S. Pat. No. 4,789,006 that a product was produced having a combination of properties commercially acceptable for use as sausage casings.

Various different terminology has been used to describe the products of cellulose and urea, such as cellulose aminoformates, cellulose carbamates, cellulose aminomethanoates and cellulose aminomethanates as adopted in U.S. Pat. No. 4,789,006. To deter further confusion, the products formed with cellulose and urea as presented in the above patents and hereinafter will be referred to as cellulose aminomethanates.

Even though a cellulose aminomethanate product can now be made which is suitable for use as a sausage casing, problems still exist in the manufacturing process occasioned by the difficulty of removing prior art carriers, such as sodium hydroxide, used to obtain uniform distribution of the urea through the cellulose structure prior to the formation of the cellulose aminomethanate. This need for uniform distribution of the urea is disclosed in U.S. Pat. No. 4,404,369 and achieved by using liquid ammonia which can be subsequently removed by volatilization. However, liquid ammonia is highly volatile, toxic, pungent, forms explosive mixtures with air and requires excessive refrigeration and special equipment for safe handling and recovery.

In a later process, disclosed in European Patent Application No. 85890246.3 (1985), uniform distribution was achieved by using high concentrations of sodium hydroxide which was then washed out with neutral aqueous urea. Such process, however, requires the handling of large volumes of liquid and creates associated recovery problems.

It is an object of this invention to improve the distribution of urea throughout the cellulose structure prior to the formation of cellulose aminomethanate.

It is another object of this invention to provide an improved cellulose aminomethanate material having uniform distribution of aminomethanate substituent.

It is a further object of this invention to provide a convenient means for processing cellulose which has been steeped in sodium hydroxide.

It is a still further object to provide a means to reduce and/or eliminate the growth in volume of extracting liquids for successive batches of urea-alkali steeped pulps.

It is still another object to provide a means to allow recycle of alkali and urea used for steeping.

SUMMARY OF THE INVENTION

This invention is based on the finding that when sodium hydroxide and urea are in a steeping solution used for swelling cellulose for the uniform distribution of urea in the cellulose and the resulting cellulose/urea mixture is concentrated, the steeping solution recovered from a concentrated cake can be treated with an ion-exchanger, in a coupled mode, for the convenient and efficient removal of caustic values. Thus, a product appropriate for thermal cure, can be quickly and easily obtained regardless of temperature, without using the large volumes of processing fluids required in the prior art.

The aforementioned objects and more are achieved by an improvement to the process for synthesizing cellulose aminomethanate which comprises slurrying cellulose in an aqueous caustic solution, in the presence of urea, steeping the slurried mixture for a time sufficient to permit swelling of the cellulose for uniform distribution, pressing or otherwise concentrating the mixture to remove a major part of the caustic and urea for recycle, and extracting the caustic from the concentrated mixture by treatment with an ion- exchanger.

It was found that when cellulose aminomethanate is manufactured from product prepared in accord with this process, it has a uniform distribution of the substituent throughout the cellulose at the molecular level, comprises a suitable product for manufacturing sausage casing and significantly reduces manufacturing cost by permitting efficient urea and caustic recycle.

DETAILED DESCRIPTION OF THE INVENTION

The synthesis of cellulose aminomethanate suitable for use in the manufacture of sausage casings involves at least three controlling elements First, the cellulose structure of the material used must be impregnated with urea in a uniformly distributed manner to assure that a final product will be obtained having suitable consistency for the manufacture of sausage casings Second, the thus impregnated cellulose structure must be dried to remove liquid and treated to efficiently decompose the urea to form the cellulose aminomethanate derivative. Third, the thus formed derivative usually is processed to provide a storageable raw material for the subsequent manufacture of sausage casing.

A critical factor in the above sequence is the method used to obtain uniform urea distribution in the cellulose and the efficiency of the decomposition process forming the derivative.

In order to achieve uniform distribution, it has been found that the hydrogen bonded networks and associated crystalline structure of cellulose need to be broken to make the cellulose highly accessible to the urea. In the process of U.S. Pat. No. 4,404,369 this accessibility is accomplished by steeping cellulose in a solution of urea in liquid ammonia, the liquid ammonia apparently acting to cause the cellulose to swell, which makes the cellulose more accessible to the urea. The product of such processing appears to have a suitable distribution of urea within the cellulose and can be reacted to form a cellulose aminomethanate of appropriate quality for manufacturing sausage casing as described in U.S. Pat. No. 4,789,006.

In U.S. Pat. Nos. 2,129,708 and 2,134,825 and European Application 85890246.3 the method of achieving distribution of the urea is by steeping cellulose in urea dissolved in sodium hydroxide at temperatures up to 65° C. Such process has merit in that swelling of the cellulose structure is achieved and urea can theoretically be distributed therethrough. A problem exists however, in the removal of the sodium hydroxide after the urea has been distributed, making it difficult to produce a suitable cellulose aminomethanate product. The removal of caustic by prior art means generally involves direct pressing and multiple washings with dilute aqueous urea followed by more pressing steps. The direct pressing leaves enough caustic with the cellulose to degrade it to undesirably lower average Degree of Polymerization(DP) levels during the thermal cure step. The washing process increases material and energy use and creates a caustic containing waste-product disposal problem.

It has been discovered that if the cellulose is slurried in an aqueous caustic solution, which also contains an appropriate quantity of urea for reaction with the cellulose, and the slurry is steeped to efficiently cause the cellulose to swell and accept uniform distribution of the urea, that extracted steeping solution obtained after concentration can be thereafter treated, using a coupled ion-exchanger, to create a substantially pure urea solution which can be conveniently recycled. When low concentration caustic solutions, of minimum volume and low temperature, are utilized in steeping, an adequate cellulose aminomethanate product quality is achieved without the multiple washings of the slurry with dilute aqueous urea as required by the prior art and without the concurrent material, energy and waste-product disposal costs associated therewith.

Thus, instead of repeated washing and pressing to remove caustic as required by the prior art, the process of this invention achieves an adequate cellulose aminomethanate product using a processing step which can result in significant material, energy and waste-product disposal cost savings.

Urea containing, used alkali, steep solutions can be purified and reduced in pH by treatment with a coupled cation exchanger material. The low concentration free alkali can be removed by neutralization with a cation exchange material in the hydrogen ion or acid form. In general, the reaction is carried out by merely mixing the solution with the cation exchanger which results in a rapid reaction removing most of the basic impurities. The reaction which takes place is a straight forward neutralization reaction, is quite rapid, and seems to be limited only by the rate of diffusion of the alkali into contact with the acidic sites on the ion exchange material. While the process is most effective when used with commercially obtainable, high capacity ion exchange resins, it is effective to a substantial degree with any material having cation exchange properties which can be converted to the acid form by treatment with a strong acid. In general, the neutralization of the free alkali solution can be carried out using cation exchanger materials in a definite and predetermined manner with the result that the pH of the treated solution can be calculated in advance by an evaluation of the stoichiometry of the reaction.

Ion exchanger materials illustrative of cation exchangers which can be used in this process include: sulfonated phenolformaldehyde resins (prepared by condensation of phenol sulfonic acid with formaldehyde, or by alkaline condensation of sodium phenolate with sodium sulfite and formaldehyde), e.g., Zeo-Karb 215, Zeo-Karb 315, Amberlite IR 1, Amberlite IR 100, Duolite C 10, Duolite C 3, Dowex 30; polystyrene sulfonates cross-linked with divinyl benzene, e.g., Zeo-Karb 225, Amberlite IR 120, Duolite C 20, Dowex 50, and Nalcite HCR; sulfonated coal, e.g., Zeo-Karb H 1: nuclear substituted polystyrene phosphonate resins, e.g. Duolite C 60 and Duolite C 61; carboxylic resins, e.g., carboxylated phenolformaldehyde resins, Zeo-Karb 216, and copolymers of acrylic acid with divinyl benzene: Zeo-Karb 226, Amberlite IRC50, Duolite CS 100, acid treated zeolites; naturally occurring non-resinous ion exchange materials, e.g., cellulose wood fibers (bast fiber) including fabricated forms thereof such as webs, papers, fabrics, and the like. The foregoing materials are merely illustrative and are not meant to comprise a limitation thereto. The reference to ion exchanger in the claims is intended to be generic to ion exchange material of the high capacity resinous type, to liquid ion exchangers, and to naturally occurring non-resinous ion exchange materials such as acid treated coal, cellulose wood fibers, fabrics, webs, papers, and the like which are known to have cation exchange properties.

In the following discussion and description of the invention by slurried is meant that the cellulose material has been dispersed and is intimately intermingled and wetted with a urea containing aqueous caustic solution. The size of the cellulose pieces in the slurry can vary greatly with the form that the cellulose is in as well as the time that is available for the caustic solution to break down and thoroughly wet the cellulose. It was found that when using thin cellulose, dissolving pulp sheets that cellulose pieces smaller than several inches square were generally adequately broken down and wetted within 5-10 minutes, a reasonable time frame for commercial use.

The concentration of the aqueous caustic/urea solution used can be of any concentration practiced by the prior art including the high, medium and low concentration caustic treatments described in various of the prior art patents including the process of U.S. patent application Ser. No. 365,267 filed by M. Rahman and D. Bridgeford on even date herewith, entitled Preparation of Cellulose Aminomethanate and incorporated herewith by reference.

Generally it has been found desirable to limit the caustic concentration in accord with the aforesaid application to range from about 2 to about 10% caustic by weight and preferably from about 4 to about 8% by weight caustic. The temperature of the caustic solution can vary greatly, anywhere from below about $-15$ degrees centigrade to well in excess of room temperature, above about 35 degrees centigrade. Generally, when using low concentrations of caustic it is desirable to use lower temperatures, as disclosed in the foregoing identified application, from about −15° to about +10° C.

The concentration of urea necessary to provide adequate reactant for the formation of cellulose aminomethanate generally ranges from about 12 to about 35% urea by weight and preferably from about 15 to about 30% by weight. A preferred aqueous solution would contain from about 4 to about 8% caustic and from about 15 to about 30% urea by weight.

The amount of urea present in the caustic solution does not appear to markedly change the degree of swelling for a given caustic concentration and a given steeping temperature. Thus, the concentration of urea will preferably be adjusted in accord with the cellulose content of the slurry to attain adequate urea for reaction with the cellulose upon uniform distribution. In practical terms the amount of urea used should constitute a generous excess in order to obtain an initially high degree of substitution for good quality cellulose aminomethanate.

The volume of aqueous solution used in the process is generally preferred to be minimized. The volume of aqueous component must be sufficient to assure wetting of the cellulose while containing adequate quantities of caustic to swell the cellulose and urea to penetrate therewith. Thus, the greater the concentration of caustic, the less volume may be utilized. Generally, when using low caustic concentrations, a ratio of combined caustic and urea containing aqueous solution to cellulose should be less than about 15:1 and preferably less than about 10:1 when using dilute caustic solutions.

The cellulose will generally be wetted very quickly utilizing the aqueous caustic/urea containing solutions of this process. It is preferred to agitate or mix the components so that a uniform mixture is quickly obtained, however mixing is not always necessary depending upon the form of cellulose used and/or the method of addition of the caustic and urea practiced. For example, the cellulose may comprise an aqueous slurry to which caustic and/or urea are added in amounts appropriate to form a solution with the aqueous component of the slurry or a portion thereof.

Thus, it is within the contemplation of this invention to include the addition of high caustic and/or urea concentrations to an aqueous cellulose slurry to form a low caustic concentration slurry, as well as treating the cellulose material with a low concentration caustic solution.

Generally, any temperature of the prior art can be used in the steeping step of the process. In accord with the afore identified application however it is desirable to initially mix the cellulose with the caustic/urea solution at ambient temperature or below, then reduce the temperature of the mixture to below about 0° C. However, cold caustic/urea solution can be added to a higher temperature cellulose material and the reverse or both may be cold or hot. In a similar manner, caustic and urea can be added to a cooled cellulose slurry or the reverse. The only temperature requirement of this invention is that the cellulose, the caustic and the urea be brought together at an adequate temperature, concentration and relative weight ratio, and steeped for a sufficient time to permit swelling of the cellulose and attachment of the urea to the swelled cellulose molecule.

Generally, in processing of a cellulose pulp slurry, steeping at an appropriate temperature for from about 15 minutes to an hour is adequate. The slurry should be steeped for an amount of time sufficient to swell the cellulose and allow migration of the urea into the cellulose structure, however, steeping can be continued for longer times as long as no significant adverse effect is imposed upon the cellulose structure.

Extracting the steeping solution and contacting it with an ion-exchanger, is typically the next step in the process. Prior to extraction, the steeped mixture is typically initially pressed or otherwise concentrated, which allows recovery of a major portion of the usable urea and caustic for recycling. Extraction is conveniently accomplished by treatment with a urea solution of about the same concentration as originally contained in the steeping solution Typically, by the process of the invention, the steeped mixture is initially pressed to an appropriate urea loading and the pressed cake is extracted using an aqueous solution containing between about 12 and about 35% urea. Both the solution attained from the pressing and the extracted alkali/urea solution are contemplated as being contacted with the ion-exchanger by a preferred process of the invention.

The extraction solution can be simply treated by passing the extracted steeping solution through an ion-exchange column containing an appropriate quantity of a cation exchanger. The presence of soluble cellulose components are problematical however as they tend to coat the matrix of the ion-exchanger, thus it is generally desirable to filter the solution prior to contact with the ion-exchanger.

The cellulose components in the dilute alkali steep solution can typically be easily filtered out by conventional means, and thereafter recycled or otherwise recovered. Generally any adequate plate and frame filter, disk filter or continuous filters such as cartridge or candle filters can be used.

A suitable and convenient method of cellulose aminomethanate synthesis with high DP cellulose, can be achieved through ionexchange neutralization of the residual caustic after the aqueous caustic/urea steep and pressing. Such system can be operated, using minimal fluid volumes so that no residual caustic appears to be left in the slurry to degrade the cellulose or consume the reagent and form intermediates in side reactions. This in turn permits better monitoring and control over the extent of reaction by following its stoichiometry quantitatively.

The ion-exchange extraction coupled technique can be applied to low caustic/low temperature steeping, high caustic/room temperature steeping and any combination of conditions. It can also be applied to separately mercerized alkali cellulose crumb as produced in commercial viscose processes. The urea-cellulose product made from such process can be thermally decomposed to produce the cellulose aminomethanate. The product can be washed with water, dissolved in cold sodium hydroxide solutions with or without added Zincate. The resulting viscous solution can then be used to make strong films or fibers by processes similar to the conventional viscose process.

One method of the invention comprises an ion-exchange coupled loop wherein the pressed steeped cellulose/urea/caustic slurry is suspended in an aqueous urea solution and the solution is mixed thoroughly with the suspension then pumped through a filter into an ion-exchanger and re-circulated back into the original suspension. Such process can produce a salt-free, cellulose/urea product suitable for forming the cellulose aminomethanate and allows the pH of the urea solution to be stabilized in equilibrium with the urea impregnated cellulose. However, since the original alkaline suspension typically contains soluble cellulose fractions which can precipitate inside the ion-exchange column, filtering must be carefully done.

The extraction coupled loop can be conducted at a wide range of temperatures, even at temperatures below 0° C. The lower temperature, particularly after a preliminary filtration to remove the dissolved cellulose, permits the recycling of urea solutions with minimal loss of urea due to degradation due to the presence of the sodium hydroxide.

The ion exchange-extraction process permits concentration and disposal of small amounts of the extracted sodium hydroxide, if desired, and also permits the recycling of the more concentrated caustic laden urea solutions to subsequent steeping steps if desired. However, since the amount of steep liquor required for the cellulose in steeping steps can be maintained low by using liquor ratios of about 1:10 to about 1:15, all of the alkaline urea solutions may generally be re-used as alkali in the recycled step for the steeping process.

The pressing step acts to rid the slurry of most of its aqueous component. An optional washing step, with dilute urea, acts to disperse remaining salts and assure an excess of urea. Generally only one pressing is necessary and one optional washing with dilute aqueous urea. The washed slurry is then filtered and/or centrifuged to a desired press weight ratio(PWR). Press weight ratio is calculated by dividing the wet weight of the pressed pad by the weight of the dry cellulose starting material. The extent of pressing will vary the urea add-on for a given concentration of urea in the steep liquid.

It is realized that the presence of small amounts of sodium hydroxide in the pad of urea-impregnated cellulose that has been cured, will result both in some saponification of the urea due to the presence of the caustic, as well as some discoloration, degradation, and depolymerization of the cellulose at high temperatures. In some cases, this depolymerization may be desirable if a very high molecular weight, dissolving pulp was the original starting material An advantage of the ion exchange-extraction coupled loop is that it permits very rapid and convenient reduction of the alkali in the urea extracting solution to neutral or even below neutral in a few minutes. The resulting impregnated cellulose can be cured in some cases under very high temperature, very short curing times, and frequently results in little discoloration. A reduction in $DP_V$ (degree of polymerization measured by viscosity) due to high temperature cure is observed as taking place, with little reduction being seen as the result of appreciable amounts of residual caustic as might be found in prior art processes.

The following examples are provided to exemplify the invention and are not meant to be a limitation thereof.

EXAMPLE I

Coupled ion exchange-extraction with a super ambient temperature steeping step.

1926 g of Buckeye V-65 pulp having an average $DP_v$ of 530 and in the form of 9"×12" dimensioned sheets were interleaved vertically into a steeping tank containing about 28 Kgs of an aqueous 20% urea/10% sodium hydroxide solution at 35° C. The sheets were added slowly, in the 9" direction, in groups of four so that the liquid level was behind the capillary level in the sheet. The addition required about 4.5 to 5 minutes for complete immersion. The sheets began to swell very rapidly to approximately 8 to 9 times their initial thicknesses with about 80% of the fluid appearing to be absorbed. The steeping was allowed to continue, undisturbed, for 1 hour after which approximately 8 Kg. of the steeping liquid was decanted. The swollen sheets were then dumped into an extraction tank containing approximately 80 Kg. of 20% aqueous urea extracting solution at about 25° C. The tank had a cylindrical plastic tubing filter at the bottom which was perforated on 1½" centers and wrapped with a filter cloth material.

The caustic impregnated sheets of pulp were stirred with a powerful air-motor for approximately 10 minutes to secure a uniform fibrous slurry of the swollen material in the extracting solution. The resulting fibers were somewhat de-swollen because of the reduction of the alkali concentration associated with the dispersion into the extracting liquid. The filter cloth covered, perforated plastic pipe on the bottom of the tank was connected to the input of a corrosion resistant motor and pump, and the liquid recycled through a 1.5 cubic ft. strong acid exchange resin-containing ion exchange column. The column had previously had the water in it displaced with approximately 50 liters of a 20% aqueous urea solution to avoid dilution of the urea during recycling through the column and back into the extracting tank. The water used for this solution was ordinary tap water and the liquid coming from the ion exchange column back to the tank, had a pH of about 3-3.4 attributed to the conversion of salts in the tap water to the corresponding acids The pumping rate ranged from about 5 to 6 gallons per minute and a final slurry pH of 13 was obtained in 25 minutes.

Upon obtaining the pH of 13, the slurry was pumped off from the 20% urea solution with the aid of the filter-covered sparger at the bottom of the tank. The resulting wet, urea-impregnated, slightly alkaline wood pulp was added to a stainless steel home type washer and the washer operated on a 7 minute centrifuge cycle, twice, to produce a final pad having a weight of 7880 g. The wet pad was removed from the centrifuge and introduced into a 34 cm diameter, 10 ton arbor press to squeeze off additional excess liquid so that a final cake was obtained having a weight of 5228 g.

The pressed material was divided up, placed in four large, thin metal trays at about 4–4½ cm pad thickness and dried overnight in a high air velocity evaporation oven at about 71° C. The low temperature was used to avoid urea migration within the pad during the process of drying. A dried, white, urea-impregnated cellulose resulted which was then heated in the same evaporation oven adjusted to a temperature of 93° C. for 1 hour to bring the contents of the trays near, but below, the rapid thermal decomposition temperature of the urea.

The oven temperature setting was then increased to approximately 168° C. and the urea-impregnated cellulose samples heated for 180 minutes The resulting cured cellulose-urea material was of light to medium tan color, and was uniform in color throughout the thickness of the pad that was cured.

The cured material was washed, with stirring, for three, ten minute washes using about 80 liters of hot tap water per wash.

The resulting, almost white, material was pressed to about 70%–80% water and dried at about 110° C. in a high air velocity oven. The dried product was determined to have a 2.35% nitrogen content.

The resulting fibrous material was readily dissolved in a solvent consisting of 9% sodium hydroxide, and 1% zinc oxide to give tan colored, clear, fiber-free viscous solutions at −5° C. The solutions actually occurred at around 0°-5° C. in approximately 20 minutes with simple agitation, and had a $DP_V$ of 360.

EXAMPLE II

Ion-exchange decoupling using a 10% NaOH/ 20% urea aqueous solution at 20° C.

An aqueous steeping liquid was prepared comprising 10% sodium hydroxide and 20% urea at a temperature of 20° C. Following the procedure of Example I, 1826 g of 9"×12" sheets of V-65 Buckeye dissolving pulp sheets (Avg. $DP_v$ 530) were steeped for 1 hour. About 8 Kgs of excess liquid was first decanted from the steeped sheets and then the sheets were placed into 80 kilo of 20% urea in an extraction tank coupled with the ion exchange column. In this case the pH of the extracting liquid was reduced to approximately 7 prior to filter-off and centrifuging in accord with Example I.

The centrifuge mass weighed 6420 g and was then pressed with the 34 cm diameter arbor press to 5458 g. The resulting pressed urea-impregnated, cellulose pulp was spread in trays in layers at about 4 cm thickness and dried over night in an evaporation oven at 66°-71° C. White, dry, urea-impregnated pads resulted which were preheated for 1 to 1½ hours to a temperature of 90° C. prior to cure. The evaporation oven was then adjusted to 168° C. and the preheated pads were allowed to cure therein for 180 minutes. The resulting very light tan, and very uniform colored pads were then dumped into the large extraction tank, washed, with stirring in hot tap water three(3) times for 10 minutes each time, to give rise to a final, very light tan cellulose aminomethanate product.

The resulting dry material had a nitrogen content of 2.56% and was readily soluble in aqueous cold, 8% sodium hydroxide with intervening freeze-thaw cycle and in aqueous 9% sodium hydroxide, 1% zinc oxide solution at approximately −5° C. at 7% polymer concentration. Dissolution in both cases took place in approximately 30 minutes. The resulting solutions were virtually fiber-free when observed at low magnification under polarized light. Both were filterable to give usable polymer dopes having a $DP_V$ of 423.

EXAMPLE III

Low temperature, low caustic concentration and volume.

Approximately 2.12 Kg of Buckeye V-65 dissolving pulp (Avg. $DP_v$ 530), having a 6% moisture content, was slurried with 20 Kg. of aqueous 6% sodium hydroxide, 20% urea solution at 0° C. and allowed to steep for one hour. This material was very highly swollen and semi-gelatinous. The product was thereafter treated in accord with Example I by placing the total contents of the into an extraction tank containing 60 Kg. of 20% urea extracting solution at 25° C.

The resulting mixture was stirred for 15 minutes to create a uniform mixture and to allow extraction equilibrium to occur between the pulp and extracting liquid. The ion exchangeextraction loop was conducted after the first extract was filtered-off for later recovery. A second incremental of 60 Kg. of pure 20% urea was added and the ion exchange-extraction continued for approximately 20 minutes to a pH of 11.5. The resulting, filtered-off pad was then centrifuged and pressed as described in Example I to attain 7.3 Kg of material.

The pressed material was divided up, placed in trays at about 3 cm thickness and dried at low temperature overnight to approximately constant weight. The resulting pads of urea-impregnated cellulose were preheated in an oven at high air velocity for 1 hour at 93° C. The oven was then adjusted to 168° C. and the pads were cured for 180 minutes. The resulting light tan color pads were uniform throughout their thickness. After washing in accord with Example I, the final product was determined to have a nitrogen content of 2.46% and a $DP_V$ of 500.

The cellulose aminomethanate was soluble in 9% sodium hydroxide, 1% zinc oxide solution when slurried initially at 15° C., then rapidly cooled to −5° or −6° C. An almost fiber-free filterable viscous dope was achieved with a 7% concentration of the polymer pulp.

What is claimed is:

1. In a process for synthesizing cellulose aminomethanate, wherein cellulose, slurried in an aqueous urea containing, caustic steeping solution, is steeped to form a mixture of swelled cellulose intermingled with urea, concentrated to remove a portion of the alkali and urea, and thereafter is heated to form cellulose aminomethanate, the improvement comprising extracting the concentrated mixture with an extracting solution and contacting the extracting solution with an ion exchanger.

2. The process of claim 1 wherein a liquor, containing urea, is recovered through said contacting of the extracting solution.

3. The process of claim 1 wherein the steeping solution is separated from soluble cellulose components, by filtration, before contacting with an ion-exchanger.

4. The process of claim 1 wherein the ion exchanger is regenerated.

5. The process of claim 1 wherein aqueous urea is separated from the solution, recovered and recycled.

6. The process of claim 1 wherein cellulose, in a weight ratio of from about 1:6 to about 1:15, is slurried with an aqueous solution comprising from about 2 to about 10% by weight caustic and about 12 to about 35% by weight urea, steeped at a temperature from about 0 degrees centigrade to about −10 degrees centigrade for a time sufficient to form a mixture of swelled cellulose intermingled with urea, concentrated by pressing, extracted with an aqueous urea containing solution, contacted with a coupled ion-exchanger and thereafter heated to form the cellulose aminomethanate.

7. The process of claim 1 wherein at least part of the steeped cellulose, urea and caustic containing mixture is suspended in an aqueous urea solution, the suspension and solution are pumped through a filter to contact with an ion-exchanger and thereafter recycled back to the steeped mixture.

8. Cellulose aminomethanate, produced by a process wherein cellulose is slurried, in a weight ratio of from about 1:6 to about 1:15, with an aqueous solution comprising from about 2 to about 10% by weight caustic and from about 12 to about 35% by weight urea, steeped at a temperature from about 0 degrees centigrade to about −10 degrees centigrade for a time sufficient to permit swelling of the cellulose and distribution of the urea in the vicinity of available hydroxy units within the swelled cellulose structure, concentrated by pressing, extracted with an aqueous urea containing solution, contacted with a coupled ionexchanger and thereafter heated to a temperature sufficient to cause reaction of the urea with the cellulose structure.

9. The cellulose aminomethanate of claim 8 wherein from 0.5 to 30 numerical percent of the cellulose hydroxy groups have been substituted with aminomethanate groups.

10. A tubular sausage casing comprising the cellulose aminomethanate of claim 8.

11. A tubular sausage casing comprising the cellulose aminomethanate of claim 9.

12. The tubular sausage casing of claim 11 wherein the cellulose aminomethanate in the sausage casing is regenerated to reduce the degree of substitution below 0.5.

13. Cellulose aminomethanate, produced by a process wherein cellulose, is steeped in an aqueous urea containing caustic solution to form a mixture of swelled cellulose intermingled with urea, the mixture is concentrated to remove a portion of the alkali and urea then extracted with an extracting solution which solution is thereafter contacted with an ion exchanger, and heating the mixture to form cellulose aminomethanate.

14. The cellulose aminomethanate of claim 13 wherein from 0.5 to 30 numerical percent of the cellulose hydroxy groups have been substituted with aminomethanate groups.

15. A tubular sausage casing comprising the cellulose aminomethanate of claim 13.

16. A tubular sausage casing comprising the cellulose aminomethanate of claim 14.

17. The tubular sausage casing of claim 16 wherein the cellulose aminomethanate in the sausage casing is regenerated to reduce the degree of substitution below 0.5.

* * * * *